United States Patent Office 3,461,863
Patented Aug. 19, 1969

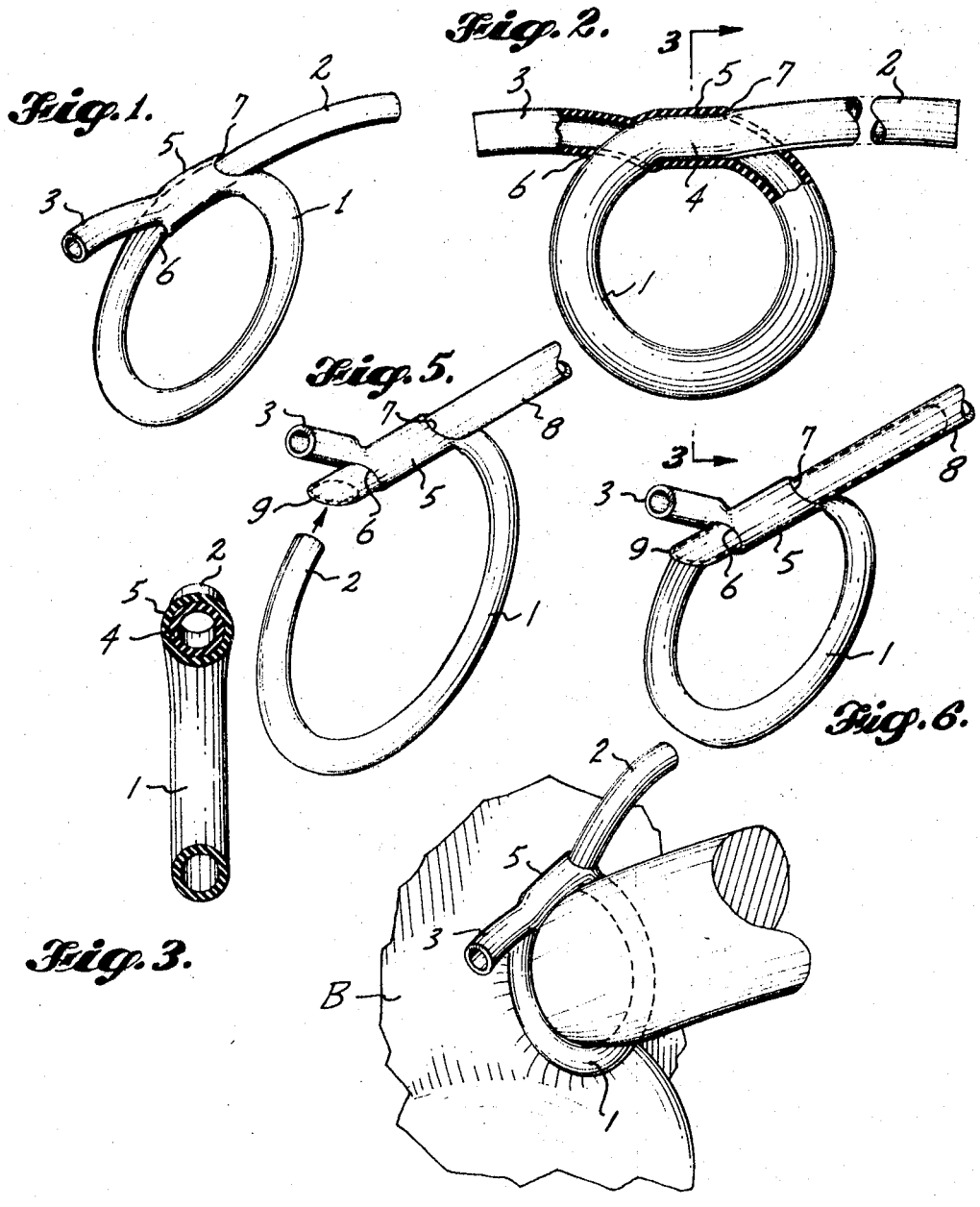
INVENTOR.
GLEN R. SULLINGER
BY Robert W. Beach
ATTORNEY

3,461,863
TURGIDITY-MAINTAINING TOURNIQUET
Glen R. Sullinger, Rte. 3, Box 286,
Arlington, Wash. 98223
Filed Feb. 23, 1967, Ser. No. 618,148
Int. Cl. A61f *5/00, 15/00;* A61b *17/12*
U.S. Cl. 128—79                      5 Claims

ABSTRACT OF THE DISCLOSURE

A tourniquet in which a bight is maintained in a tough and highly stretchable rubber tube by passing a stretch of such tube through apertures in a connected tube stretch located in opposite sides of the tube and spaced lengthwise of the tube. The bight can be constructed by inserting through such offset apertures and the intervening tube section a rigid tube having an internal cross section greater than the external cross section of the unstressed tube and having an end beveled to facilitate threading of such tube through the rubber tube apertures, and threading a flexible tube stretch through the rigid tube.

---

A principal object of this invention is to provide a turgidity-maintaining tourniquet which is effective to produce and maintain a voluntary and controlled penis erection by applying even, localized and selected pressure circumferentially around the root of the penis.

It is also an object to provide such a tourniquet the size of which can be adjusted easily and quickly, which tourniquet can be applied to and removed from the penis quickly and easily and which, during such manipulation, will maintain its adjustment accurately.

Another object is to provide such a tourniquet which is simple in construction, not requiring or incorporating any clamps and which is compact and unobtrusive.

It is also an object to provide such a tourniquet which can be sterilized at will without appreciable deterioration, which is inexpensive and yet durable.

FIGURE 1 is a top perspective of the tourniquet of the present invention.

FIGURE 2 is a side elevation of such torniquet, parts of which are broken away, and FIGURE 3 is a section through the tourniquet on line 3—3 of FIGURE 2.

FIGURE 4 is a top perspective of the tourniquet in use.

FIGURE 5 is a top perspective of a loop of flexible tubing during the process of being formed into a tourniquet, and FIGURE 6 is a similar view showing a further stage in making the tourniquet.

It has been found that sufficient turgidity can be induced in a voluntary and controlled manner in a penis to produce an effective erection for coitus in an impotent male by applying the tourniquet of the present invention, properly adjusted, to the root of the penis, as shown in FIGURE 4. Adequate turgidity is induced and maintained by constricting the efferent veins communicating with the caverous tissue of the penis without unduly constricting the afferent arteries leading to such tissues. The tourniquet must provide sufficient localized pressure so that the efferent veins will become gorged with blood, which changes the erectile tissue from flaccid to turgid condition.

The tourniquet of the present invention which has been found to be effective for such use is constructed as a self-sustaining bight which is, nevertheless, readily adjustable in girth. Such bight preferably is made of tough, strong, highly stretchable rubber tubing, such as tubing of gum rubber, surgical rubber or latex rubber. The bight includes a loop 1 having an internal end stretch 2 and an external end stretch 3 directed in opposite directions as shown in FIGURES 1 and 2. In crossing, the internal end stretch has a section 4 which extends concentrically through a section 5 of the external end stretch by passing through apertures 6 and 7 in opposite sides of such external end stretch and spaced apart lengthwise of the tube.

In a tourniquet of this configuration the apertures 6 and 7 should be substantially circular and of a size approximately equal to the external cross section of the tube. Such apertures should be located in opposite sides of the external end stretch of the bight as shown in FIGURE 2 and should be spaced apart lengthwise of the bight a distance greater than the internal diameter of the tube to afford proper strength. Preferably, such apertures are spaced apart a distance approximately equal to twice the diameter of the tube.

It will be evident from FIGURE 2 that the section 5 of the external end stretch 3 between the apertures 6 and 7 constitutes a clamping sleeve for the section 4 of the internal end stretch passing through the section 5. The exterior of section 4 and the interior of section 5 will thus be frictionally engaged to deter relative longitudinal movement of the parts 4 and 5 when tension forces are applied in opposite directions to the external end stretch 3 and to the internal end stretch 2, or to opposite sides of the loop 1. The extent of deterrence to movement of the sections 4 and 5 produced by their interengagement is determined principally by the wall thickness of the tubing, the material of which the tube is made and the distance between the apertures 6 and 7. The thicker the tube, the farther apart such holes and the greater the friction character of the tube material, the greater will be the deterrence to change of girth of the loop 1 by application of such tension forces.

It will be evident that when a tension force is applied to the internal end stretch 2 it will tend to be elongated and its cross section consequently reduced. Application of the same tension force to the external end stretch 3 will similarily tend to reduce the cross section of the tube stretch including that of the section 5. Consequently, even though pulling on the internal end stretch 2 will tend to reduce the cross-sectional size of the section 4 to relieve deterrence to lengthwise movement of the sections 4 and 5, at the same time the tension on the external end stretch 3 will tend to reduce the cross section of section 5 correspondingly so as not to alter appreciably the deterrence to movement produced by interengagement of the sections 4 and 5.

Correspondingly, when tension force is applied internally of the loop 1, such as when the bight is being applied to the penis as shown in FIGURE 4, the section 4 will be stretched to the left to substantially the same extent as the section 5 is stretched to the right. Consequently, both sections 4 and 5 will be stretched and correspondingly constricted to approximately the same extent so that relative lengthwise movement of these sections is still greatly deterred.

It is desirable, however, to be able to adjust the girth of the tourniquet reasonably readily to fit the particular individual with the proper degree of restriction. Such adjustment can be accomplished by grasping the external end stretch section 5 lightly with one hand and pulling on the internal end stretch 2 with the other hand to draw the section 4 through the holes 6 and 7 and the section 5 to the right as seen in FIGURE 2 for decreasing the girth of the loop 1. Conversely, the external end stretch section 5 can be gripped lightly and tension applied to the left side of the loop 1 as seen in FIGURE 2 for drawing the section 4 of the internal end stretch through the holes 6 and 7 and the external sleeve section 5 to the left for increasing the girth of the loop.

FIGURES 5 and 6 illustrate a technique by which the tourniquet can be constructed. The first step in the construction of the tourniquet is to nip the apertures 6 and 7 in the opposite side walls of the tube at the desired spacing. Such nipping can be accomplished by scissors or a nail clipper, for example, and is facilitated if the tube is folded at the point where the aperture is desired. A rigid tube 8 having a beveled end 9 and a thin wall can then be inserted through the apertures 6 and 7 and the external end stretch section 5 in the manner shown in FIGURE 5. Such beveled end facilitates threading of the tube through such apertures. This tube can be made of stainless steel or other metal or of rigid plastic, such as nylon or Teflon, a trademark for polytetrafluoroethylene. In any case, it is important that the internal cross section of such tube be greater than the external cross section of the internal end stretch 2.

Insertion of the rigid tube 8 through the apertures 6 and 7 and the tube section 5 will stretch such apertures and tube section and the resistance of these parts to stretching will hold the tube 8 securely in place. The internal end stretch 2 of the tube can then be looped in the manner shown in FIGURE 5 and the end inserted into the beveled end of the tube 8 in the direction indicated by the arrow in that figure. The internal end stretch 2 is then pushed through the rigid tube, such as to the position of FIGURE 6. The rigid tube can then be withdrawn to the right in FIGURE 6, whereupon the section 5 of the external end stretch will contract to the position shown in FIGURES 1, 2 and 3 to clamp section 4 of the internal end stretch in the manner explained above.

By making the bight of gum rubber, latex rubber or surgical rubber tubing it can be stretched as necessary for application without breaking and without either aperture 6 or 7 being ripped. Rubber of such type does not deteriorate readily, so that a bight made of this material can be used over an extended period of time. Such rubber also can withstand sterilizing temperatures.

I claim:

1. A tourniquet comprising a tube having an external end stretch with apertures in its opposite sides, an internal end stretch crossing said external end stretch and extending through such apertures, and a loop connecting said internal end stretch and said external end stretch.

2. The tourniquet defined in claim 1, in which the apertures in the opposite sides of the external end stretch are spaced lengthwise of such stretch and the internal end stretch extends through the section of the external end stretch between the external end stretch apertures.

3. The tourniquet defined in claim 2, in which the distance between the external end stretch apertures exceeds the internal diameter of the tube.

4. The tourniquet defined in claim 3, in which the distance between the external end stretch apertures is approximately twice the internal diameter of the tube.

5. The tourniquet defined in claim 1, in which the tube is of tough, highly-stretchable rubber material.

References Cited

UNITED STATES PATENTS 2,581,114  1/1952  Larson _____ 128—79

FOREIGN PATENTS 178,044  2/1966  Russia.

L. W. TRAPP, Primary Examiner

U.S. Cl. X.R.

128—327